April 17, 1951  H. E. DREWS  2,549,070
APPARATUS FOR SCALDING POULTRY
Filed April 7, 1944
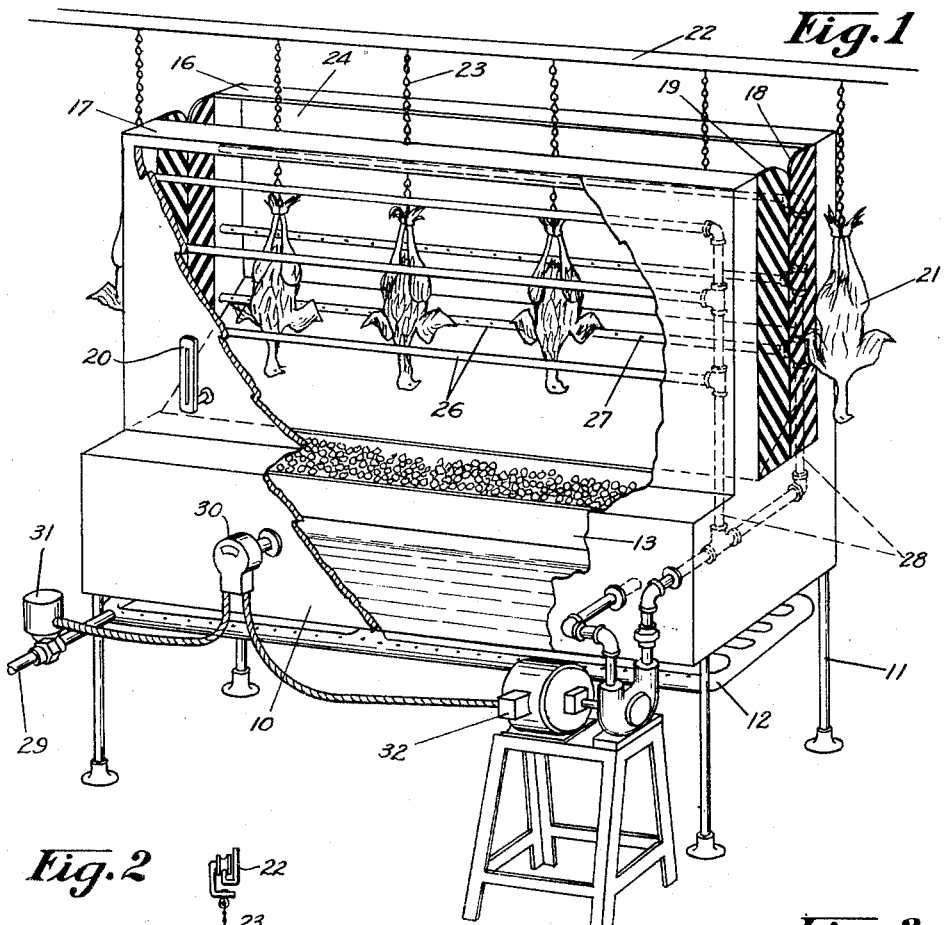
Fig.1
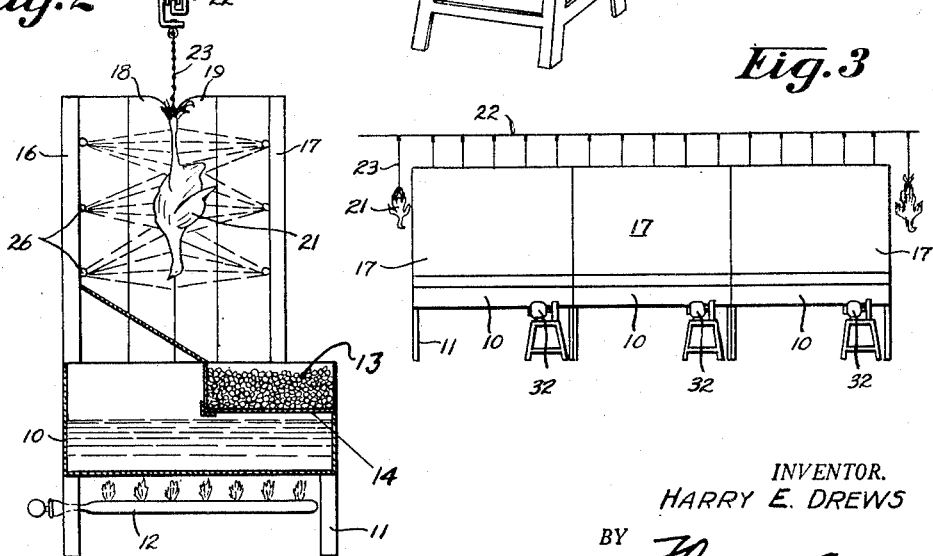
Fig.2
Fig.3
INVENTOR.
HARRY E. DREWS
BY Flournoy Corey
ATTORNEY.

Patented Apr. 17, 1951

2,549,070

UNITED STATES PATENT OFFICE 2,549,070

APPARATUS FOR SCALDING POULTRY

Harry E. Drews, Arlington, Va., assignor to Barker Poultry Equipment Co., Ottumwa, Iowa, a corporation of Iowa Application April 7, 1944, Serial No. 529,989

4 Claims. (Cl. 17—11.2)

The present invention relates to poultry scalding apparatus.

An object of the invention is the provision of a scalding apparatus of novel construction, including a box-like structure having an opening in its ends and top through which poultry can be carried on a conveyor, and such a structure that has flexible flaps normally closing the openings in the ends to prevent the accidental escape of scalding water, but adapted to flex and open to permit the passage of poultry therethrough.

Another object is the provision of a plurality of structures as just referred to, specially constructed so as to be adapted to be positioned in end-to-end abutting relationship without any space therebetween, whereby poultry can be carried through a succession of such structures for performing a scalding operation of an extended period of time.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in perspective with portions of the structure broken away to illustrate the interior of the device.

Figure 2 is a view, partly in end elevation and partly in section, to illustrate the device shown in Figure 1 taken from the far end of the device, and Figure 3 is a schematic diagram illustrating how several of the units, shown in Figures 1 and 2, may be utilized to provide for rapid movement of a conveyor line.

Referring then more particularly to Figure 1 of the drawings; the device here shown includes a main tank or water supply container 10 mounted on supports or standards 11 and heated by means of a gas burner or any other suitable heating means, as illustrated at 12.

A supply of filtering material, such as pebbles and sand or charcoal or the like, is provided so that water draining from the interior of the device drains through the filtering bed 13 before it drops into the tank 10. This layer of filtering material is supported on a perforated plate, such as illustrated at 14. The filtering material may be pebbles of rock, fuller's earth, diatomaceous earth, charcoal or any other suitable material. The filter bed or container is removable for cleaning.

Above the tank I provide a pair of box-like members 16 and 17 opening toward each other and provided with flexible adjoining end closures 18 and 19 at both ends thereof so that to all intents and purposes an effectively substantially closed box is provided through which poultry 21, suspended from conveyor track 22 by chains 23, may pass.

The poultry, such as chickens, turkeys, ducks, geese and the like, is suspended by the feet from a conveyor track, indicated at 22, by means of shackle chains 23, and the boxes 16 and 17 are sufficiently separated at the upper ends to provide a slot 24 through which the shackle claims 23 may pass, and the closures 18 and 19 flex to permit the poultry to pass therebetween. The boxes 16 and 17 provide racks by means of which spray pipes 26 are suspended. These spray pipes have small openings 27 on the inner faces thereof so that water discharged from the spray pipes is forced outwardly in needle-like streams against the poultry as it passes through the spraying chamber. A thermometer 20 indicates the temperature in the interior of the apparatus.

The water is supplied to the spray pipes by means of supply lines 28 and gas may be introduced into the burner through the gas supply pipe 29 controlled by valve 31. A thermostat 30, responsive to the temperature of the water in the tank 10, controls the valve 31. The water within the system is merely recirculated by means of the pump 32 which is connected to the main supply tank 10 and which discharges into the supply lines 28. The water thus passes upwardly through the supply lines 28 and discharges from the spray pipes 26 through the openings 27 and onto the poultry. I preferably use a penetrant such as salts of sulfated higher alcohols, other similar synthetic organics, or sulfonated oils in the spray water so that the process of wetting the feathers is quickly and efficiently carried out. There are many advantages in the use of such a penetrant and to my knowledge I am the first to utilize penetrants in high concentration in connection with scalding equipment.

I have found that glycerin, and emulsifying agents in the field of organic chemistry, have been found an aid in the retaining of bloom and as protection against abrasion.

I have provided a new and improved means for scalding poultry utilizing a plurality of fine streams of water supplied from all directions for quickly and thoroughly wetting the birds. Devices constructed according to my invention require only a relatively small volume of wetting agent. I provide a special wetting agent which may include penetrants, materials for increasing the efficiency of heat transfer, and materials for preserving bloom and protecting the birds against abrasion. Devices constructed according to my invention have a high degree of flexibility and may be used singly or in multiple. A multiple use is shown in Figure 3.

Although I have described a specific embodiment of my invention, it is apparent that modifications thereof may be made by those skilled in the art. Such modifications may be made without departing from the spirit and scope of my invention as set forth in the appended claims.

I claim as my invention:

1. A poultry scalding means for use with a chain type conveyor having means for hanging poultry therefrom, comprising a chamber comprised of vertical, parallel side walls, inwardly projecting top walls and flexible adjoining end closures to provide a pair of box-like members opening toward each other, spray pipes on the inner walls of the box having openings therein so placed as to direct water discharged from the spray pipes onto the poultry as it passes through the chamber, a main tank below the chamber and means for conducting the water draining from the poultry and the chamber to the tank, means for filtering the water, means for collecting the water, and a pump for recirculating the water through the spray pipes.

2. In a poultry scalding apparatus for use with a conveyor having means for supporting poultry therefrom, comprising a structure having a lower tank, a pair of boxes each having end walls and a top wall mounted above the tank and communicating therewith, each box having an open side and the boxes being disposed with their open sides facing each other and thereby forming an effective enclosure, the respective end walls and top walls of the two boxes being spaced apart for the passage therethrough of poultry on the conveyor, a flexible flap secured to each end wall of the boxes, the flaps at each end of the boxes extending substantially into engagement with each other and normally closing the space between the end walls of the boxes, and spray means mounted on the inner surface of said boxes adapted for spraying fluid on the poultry passing through the boxes.

3. In a poultry scalding apparatus for use with a conveyor having means for supporting poultry therefrom, comprising a structure having a lower tank, a box mounted above the tank and communicating therewith, said box having a continuous opening in the ends and top adapted for passage therethrough of poultry on the conveyor, flexible flaps normally closing the openings in the ends of the box, said flaps being adapted to be flexed by the movement of poultry thereagainst, and spray means mounted on the inner surface of the box for directing scalding fluid onto the poultry passing through the box.

4. In a poultry scalding apparatus for use with a conveyor having means for supporting poultry therefrom, comprising a plurality of substantially identical structures, each structure having a lower tank, a box mounted above the tank and communicating therewith, said box having a continuous opening in the ends and top adapted for passage therethrough of poultry on the conveyor, flexible flaps normally closing the openings in the ends of the box, said structures being adapted to be positioned in end-to-end abutting relationship whereby the poultry is carried by the conveyor successively through the boxes, with the respective flaps of adjacent structures substantially in engagement, the interengaging flaps together being adapted to be flexed by the movement of poultry thereagainst, and spray means mounted on the inner surface of each box for directing scalding fluid onto the poultry passing through the boxes.

HARRY E. DREWS.

REFERENCES CITED

The following references are of record in the file of this patent:

UNITED STATES PATENTS

| Number | Name | Date |
| --- | --- | --- |
| 1,207,512 | Dickson | Dec. 5, 1916 |
| 1,422,217 | MacLaurin | July 11, 1922 |
| 1,637,096 | Allen | July 26, 1927 |
| 1,661,356 | Baker | Mar. 6, 1928 |
| 1,719,410 | Webb | July 2, 1929 |
| 1,932,827 | Morris et al. | Oct. 31, 1933 |
| 2,001,813 | Bouda | May 21, 1935 |
| 2,041,001 | Knowlton | May 19, 1936 |
| 2,054,742 | Elbel | Sept. 15, 1936 |
| 2,132,634 | Kurt | Oct. 11, 1938 |
| 2,153,374 | Kantor | Apr. 4, 1939 |
| 2,214,562 | McCadam | Sept. 10, 1940 |
| 2,370,422 | Reed | Feb. 27, 1945 |
| 2,412,338 | Jasper | Dec. 10, 1946 |